United States Patent Office 2,802,803
Patented Aug. 13, 1957

2,802,803

CHLORINATED DIALKYL MALEATES AS PROCESSING AIDS FOR EXTRUSION OF VINYLIDENE CHLORIDE RESINS

Robert J. Reid, Canal Fulton, and William Mayo Smith, Jr., Cuyahoga Falls, Ohio, assignors to The Firestone Tire & Rubber Company, Akron, Ohio, a corporation of Ohio No Drawing. Application January 11, 1954, Serial No. 403,452

8 Claims. (Cl. 260—31.8)

This invention relates to the use of chlorinated dialkyl maleates as processing aids in the hot melt extrusion of crystalline polymers and copolymers of vinylidene chloride.

These crystalline polymeric resins have been known for some time. They have been used to a substantial extent in the manufacture of films and filaments for various purposes, but the extrusion has presented various difficulties. The high temperatures necessary for processing are very close to the decomposition temperature of the composition. Therefore, it is essential that some additive be used which will lower the processing temperature below the critical range without having any undesirable effect on the products obtained.

Such resins are characterized by crystalline behaviour, i. e., they fuse sharply to form relatively fluid melts. On quenching and orienting, the extruded filaments and films are crystalline in character. A syndrome of this crystalline habit is the recalcitrance of these resins to compounding: The macromolecules of these resins prefer contact with each other and tend to reject any foreign substances such as plasticizers and the like. In the random structure obtained without orientation any added ingredient of limited compatibility, such as the processing aids of this invention, is retained in larger percentages than is possible in the stretched or oriented products. On stretching, the tendency toward exudation or spewing is considerably increased. In orienting films and filaments of vinylidene resins they are stretched to several times their original length, and ordinarily until there is a sharp rise in the modulus. It is difficult to provide suitable processing aids which do not exhibit an undesirable spew or bloom on the surface of the oriented products and which in addition possess good heat and light stability or which at least are not detrimental to such stability.

Thus, the problem of providing processing aids for these crystalline resins is complicated not only by the fact that they tend to reject and spew the majority of conventional plasticizers, but, because the resins are extruded as hot melts at temperatures in the neighborhood of, for example, 170° C., many conventional resin-compounding ingredients tend to decompose or react with other compounding ingredients which are present when the resins are maintained in a molten state immediately prior to and during extrusion.

The crystalline resins to which the processing aids of this invention are added include both polymers of vinylidene chloride and copolymers thereof with not more than substantially 15 percent of other unsaturated compounds copolymerizable therewith. The copolymers contain at least substantially 85 percent of vinylidene chloride. Suitable comonomers for the copolymerization include, for example, vinyl chloride, vinyl fluoride, vinyl acetate, styrene, acrylic and methacrylic esters such as methyl methacrylate, ethyl methacrylate and the like, acrylonitrile, vinyl-type ethers and ketones such as methylvinyl ether, methylvinyl ketone and related compounds such as methylisopropenyl ketone and the like. For a more complete list of compounds known to copolymerize with vinylidene chloride to produce resins which can be plasticized as herein described see Krczil, "Kurzes Handbuch der Polymerisation-stechnik," vol. II "Mehrstoffpolymerisation," Edwards Bros., Inc., p. 739, the items indented under "vinylidene chlorid."

The processing aids of this invention are the dialkyl monochloro- and dichloro-maleates, the alkyl groups of which each contain one to four carbon atoms. They have excellent light stability and good heat stability as well as being stably retained in the resin. They are non-toxic, non-allergenic, and relatively free from objectionable odor. In addition, they do not appreciably increase the tendency of oriented films or filaments to shrink when exposed to elevated temperatures. Furthermore, they are sufficiently high in vapor pressure that they cause no bubbling or gassing during the extrusion operations.

The following examples illustrate the preparation of these esters. Other esters used in carrying out the invention may be produced by similar procedures.

DIMETHYL DICHLOROMALEATE

Dichloromaleic anhydride (1 mole; 167 g.) and excess anhydrous methanol (3 moles; 96 g.) were refluxed with 100 ml. of toluene containing 5 g. p-toluene sulfonic acid. No separation of the water phase could be made in the azeotrope trap, therefore 75 ml. of distillate was removed whereupon water separated immediately. Fourteen ml. of water was collected in 2 hours and 17 ml. in 6. No further water could be collected from the now wine-red reactants. The flask's contents were cooled to 40° C. and washed with an excess of 10% $Na_2CO_3$ in water followed by a water wash. It is probable that much plasticizer was lost in this wash treatment. The yield of a clear yellow, mobile liquid was 177 g. (80.0%), $B_{.137}$ 147–153° C.

DI-N-BUTYL DICHLOROMALEATE

Dichloromaleic anhydride (1 mole; 167 g.) and n-butyl alcohol (3 moles; 222 g.) were placed in a 500 ml. round-bottom flask with 5 g. of p-toluene sulfonic acid in 50 ml. of toluene. A reflux condenser and azeotrope trap were provided.

Six ml. of $H_2O$ was collected in 15 minutes after reflux began, 12 ml, in 45 minutes, 18½ in 1½ hrs., 21½ ml. in 2½ hrs. and 26 ml. in 4½ hrs. Water must have been present in the butanol to account for the water collected in excess of 1 mole. The product was cooled to room temperature and washed with an excess of aqueous $Na_2CO_3$ (10%), followed by a water wash.

Distillation, after stripping off excess butanol and the toluene, gave a light, clear yellow and mobile liquid, $B_{.3}$ 143° C. in 94.6% yield (281.2 g.).

The monochloromaleates were prepared according to the above outlined procedures using chloromaleic anhydride with the appropriate alcohols.

COMPOUNDING AND TESTING

With regard to the use of the processing aids, a small amount, in the range of 3 to 8 percent or up to 10 percent based on the weight of the resin will generally be found most satisfactory. Less than 3 percent may be used in admixture with another processing aid. Such percentages will be stably retained within the resin in the finished oriented article. Larger amounts tend to be incompatible and exude to the surface of oriented products produced from vinylidene polymeric resins containing 85 percent or more of vinylidene chloride.

The chlorinated maleates can be employed with the epoxy heat stabilizers such as glycidyl-phenyl ether, the mono-, di-, tri-, tetra- and penta-chlorinated derivatives of phenoxypropene oxide, polymeric phenoxy compounds prepared from various dihydroxy phenols and epichlorhydrin, etc. Likewise, they can be employed with the salicylate light stabilizers such as phenyl salicylate, 4-tert-butylphenyl salicylate, 4-octylphenyl salicylate, 2-methylphenyl salicylate, 4-chlorophenyl salicylate, 3-methylphenal salicylate, 4-t-amylphenyl salicylates, 4-nonylphenyl salicylate, 2-octyl-4-methyl salicylate, 2-isopropyl salicylate, nonyl salicylate, ethylhexyl salicylate, n-butyl salicylate.

The chlorinated dialkyl maleates have been used extensively in extrusions of the resins of this invention employing a variety of different formulae. The monochloro and dichloromaleates of this invention all impart desirable extrusion properties to the resins, are retained in the extruded, oriented products, and have no adverse effect on light or heat stability. Different test results are reported in the following examples:

*Example I*

The processing aids of this invention do not interfere with, and in many cases appear to actually assist, the action of heat and light stabilizers. This is illustrated by data obtained on compositions compounded as follows:

Parts by weight
Crystalline resinous copolymer of vinylidene chloride
 and vinyl chloride (85:15) _____ 100
Glycidyl phenyl ether _____ 2
4-t-butylphenyl salicylate _____ 2
Processing aid _____ 4.5 to 8

The additives were ball-milled with the resin, and samples tested for heat stability and light stability according to the methods given below.

HEAT STABILITY

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was —

1. Heat for three minutes with steam at 120 lbs./sq. in. and mold pressure of 1000 lbs./sq. ni.;
2. Water cool for two minutes under 1000 lbs./sq. in. mold pressure; and
3. Eject from the press.

The resultant cylindrical button (1.25 inches in diameter and .125—.188 inch in height) was then cut into sector-shaped specimens which were placed in a forced-draft oven at 180° C. Specimens were removed at intervals of 10, 20 and 30 minutes after placing in the oven, and the behavior of the specimens on the test as a whole was rated by the operator.

LIGHT STABILITY

One gram samples of the compositions to be tested were placed between cellophane sheets and pressed in a flat platen laboratory press under a total of 1000 lbs. at a temperature of 180° C., yielding a plaque approximately 6 to 8 mils thick. The plaques were tested according to the method of ASTM test D620–45T under a sunlamp for 240 hours and the results are recorded in column A.

Plaques were also tested in a weatherometer for 100 hours, the reports of the tests for the respective durations being reported in column B. The weatherometer was a standard X-1-A machine, using a Corex D filter and operating without the sprays.

In the light and heat-stability tests reported in Table I, the results were rated subjectively by the operator as "poor" (P), "fair" (F), and "good" (G).

SPEW RATING

A plaque of the compounded resin was pressed between cellophane sheets in a Carver press at 180° C., using approximately 1.5 grams of resin, 10 seconds preheat, and 15 seconds with the minimum pressure (pressure indicator just off zero). The plaque was quenched in cold water immediately and an approximately 3/8 inch wide strip was cut from the plaque, the cellophane removed, and the strip oriented to its limit.

The strips were placed in glassine bags under mild pressure so that contact of the strips with the bag was assured. Any exudation of plasticizer could then be noted as an oily streak on the glassine. Tests were carried out at room temperature and spew observations were made after storage for two weeks. Spew ratings of G (good) indicate little or no spew; those rated F (fair) a slight (unobjectionable) spew; but those marked P (poor) would be unsatisfactory commercially.

TABLE I—PROPERTIES OF THE VARIOUS COMPOSITIONS

| Processing Aid | Parts | Heat Stability | Light Stability | Spew |
|---|---|---|---|---|
| Dimethyl chloromaleate | 4.5 | G | G | G |
| Do | 8 | G | G | G |
| Diethyl chloromaleate | 4.5 | G | G | G |
| Do | 8 | G | G | G |
| Dipropyl chloromaleate | 4.5 | G | G | G |
| Do | 8 | G | G | G |
| Di-n-butyl chloromaleate | 4.5 | G | G | G |
| Do | 8 | G | G | F |
| Diamyl chloromaleate | 4.5 | G | G | F |
| Do | 8 | G | G | P |
| Di-n-hexyl chloromaleate | 4.5 | G | G | P |
| Do | 8 | G | G | P |
| Di-2-ethylhexyl chloromaleate | 4.5 | G | G | P |
| Do | 8 | G | G | P |
| Dimethyl dichloromaleate | 4.5 | G | G | G |
| Do | 8 | G | G | G |
| Diethyl dichloromaleate | 4.5 | G | G | G |
| Do | 8 | G | G | G |
| Dipropyl dichloromaleate | 4.5 | G | G | G |
| Do | 8 | G | G | G |
| Di-n-butyl dichloromaleate | 4.5 | G | G | G |
| Do | 8 | G | G | F |
| Di-n-amyl dichloromaleate | 4.5 | G | G | F |
| Do | 8 | G | G | P |
| Di-n-hexyl dichloromaleate | 4.5 | G | G | P |
| Do | 8 | G | G | P |

In general, it may be noted from the table that as the length of the alkyl groups in the esters increases, there is a tendency for spew to occur. This is true in the chloromaleates as well as the dichloromaleates. However, it may also be observed that in the esters possessing alkyl groups containing from 1 to 4 carbon atoms the spew is negligible. The light and heat stability of the compositions were quite outstanding. Thus, the chloromaleate and dichloromaleate compositions containing up to and including 4 carbon atoms in the alkyl chain possess the desired combination of properties for use in the vinylidene chloride polymeric resins containing as much as 85 per cent of vinylidene chloride. Increasing the vinyl chloride content of a resin gives polymeric products in which plasticizers generally are more compatible.

*Example II.—Extrusion of filaments*

Tests were conducted using various plasticizers with 4 to 8 parts by weight of dimethyl chloromaleate, together with 2 parts glycidyl phenyl ether and 2 parts phenyl salicylate as light and heat stabilizers, respectively.

The extrusions were carried out in conventional screw-type machines, the molten polymer being forced through dies to form filaments which were then quenched by passage through a water bath and cold-drawn some 400% by passage over differential speed rolls.

It was observed that with as little as four parts of processing aid smooth filaments were produced readily in gauges from .006 inch to .015 inch without heat degradation. These filaments exhibited no exudation of plasticizer on storage and possessed excellent light stability when exposed to Florida sunshine. They had good heat stability. Extrusions carried out with conventional plasticizers such as di-octylphthalate required at least 8 parts plasticizer to give desirable extrusion characteristics and the filaments on storage in all cases exuded the plasticizer.

A similar extrusion test was made using 6 percent di-n-propyl monochloromaleate, 2% ethylene glycol bis-(alpha-methylbenzyl) ether and 2 percent 2,4-dichlorophenoxypropene oxide with 2 parts of p-tert-butyl-phenylsalicylate. The extrusion characteristics were excellent and the spew rating was "good." In another test using only 4.5 percent of this processing aid and 2 percent 2,4,6-trichlorophenoxypropene oxide with 2 percent p-tert-butyl-phenylsalicylate the extrusion characteristics were rated "good" and the spew rating was "good."

The results obtained with extruded filaments were similar to those obtained with oriented films with the various processing aids.

What we claim is:

1. A resin composition which is composed of resin from the class consisting of polymers of vinylidene chloride and copolymers thereof with up to 15 percent (based on the weight of said copolymers) of another unsaturated monomer copolymerized therewith, and a substantial amount not in excess of 10 percent (based on the weight of the resin) of an ester from the class consisting of the dialkyl monochloromaleates and the dialkyl dichloromaleates in which each alkyl group contains one to four carbon atoms.

2. The resin composition of claim 1 in which the ester is a monochloromaleate.
3. The resin composition of claim 1 in which the ester is a dichloromaleate.
4. The resin composition of claim 1 in which the ester is dimethyl monochloromaleate.
5. The resin composition of claim 1 in which the ester is dipropyl monochloromaleate.
6. The resin composition of claim 1 in which the ester is dimethyl dichloromaleate.
7. The resin composition of claim 1 in which the ester is dipropyl dichloromaleate.
8. The resin composition of claim 1 which contains an epoxy heat stabilizer and a salicylate light stabilizer.

References Cited in the file of this patent

UNITED STATES PATENTS

| | | |
|---|---|---|
| 2,160,945 | Wiley | June 6, 1939 |

FOREIGN PATENTS

| | | |
|---|---|---|
| 627,235 | Great Britain | Aug. 3, 1949 |